June 16, 1931.  K. C. BERGER  1,810,748
ORNAMENTAL GUARD FOR AUTOMOBILE RADIATORS
Filed Aug. 22, 1930   2 Sheets-Sheet 1
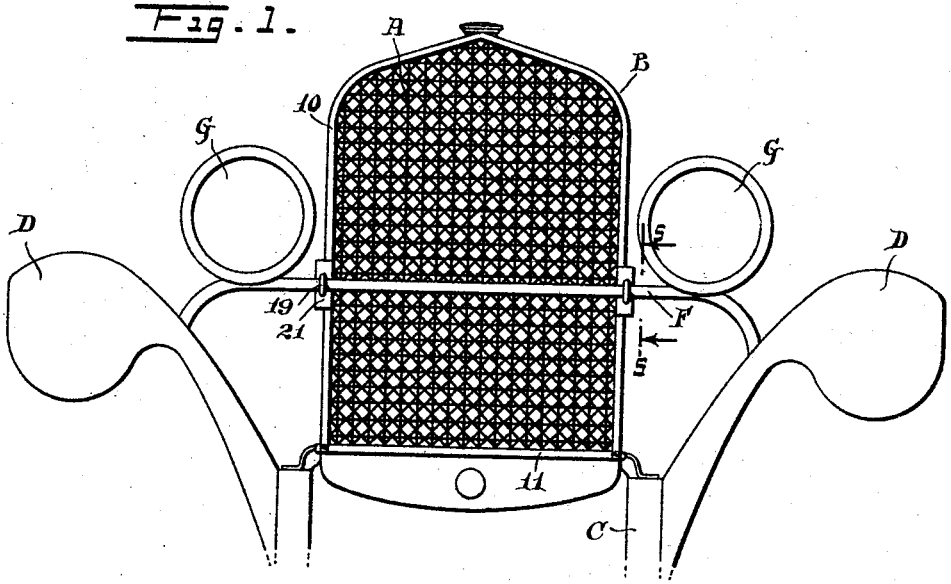
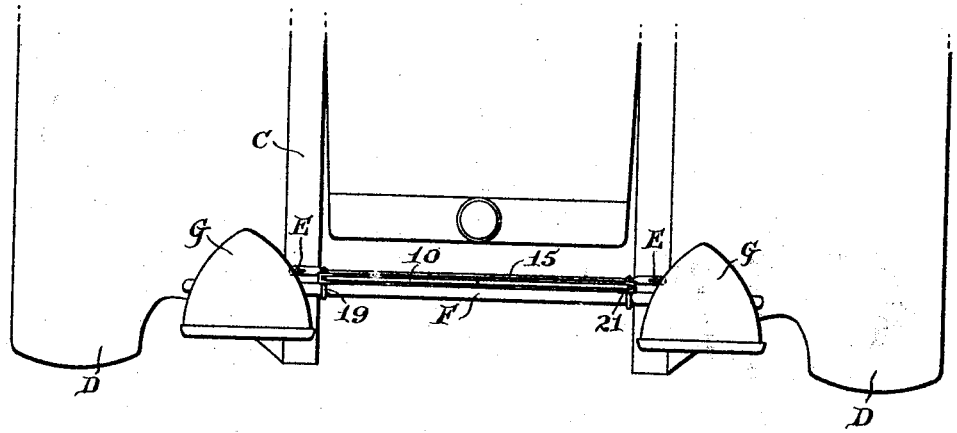

June 16, 1931.                K. C. BERGER                1,810,748
              ORNAMENTAL GUARD FOR AUTOMOBILE RADIATORS
                    Filed Aug. 22, 1930    2 Sheets-Sheet 2
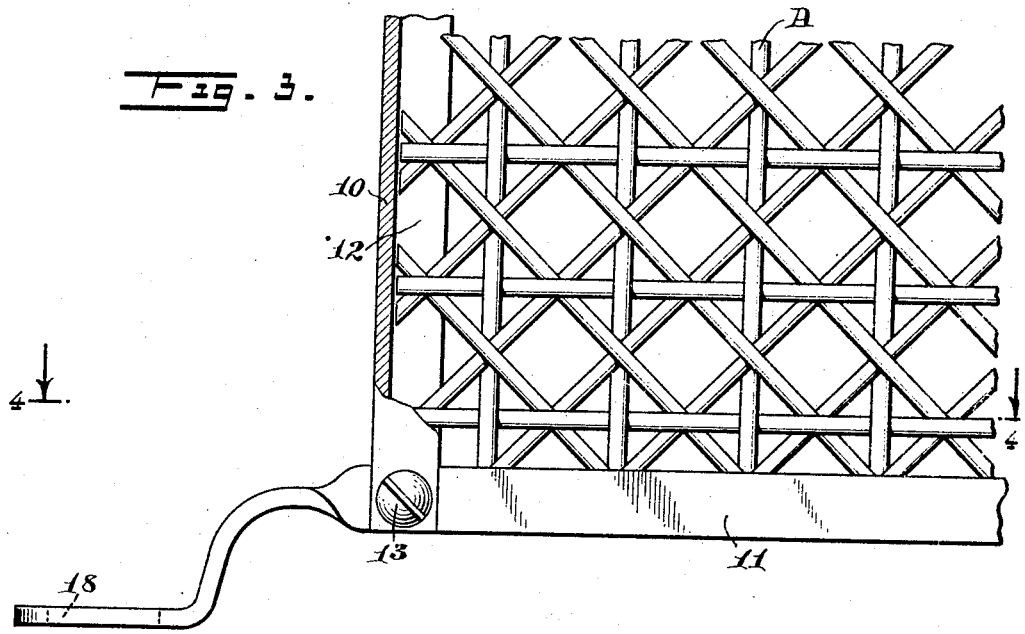
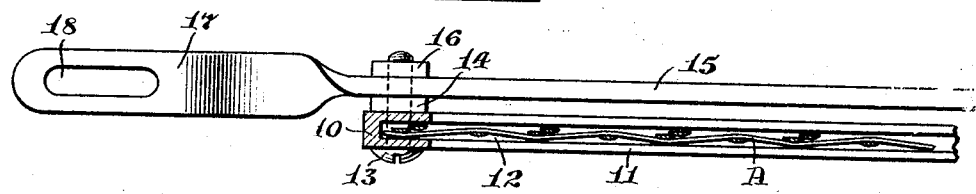
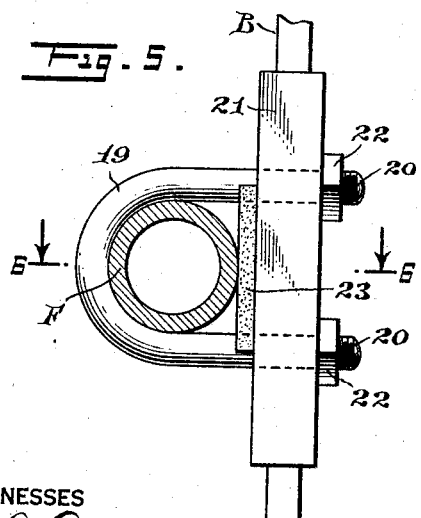
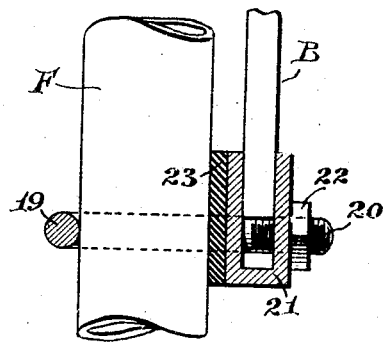
WITNESSES
INVENTOR
Kornel C. Berger
BY
ATTORNEYS Patented June 16, 1931

1,810,748

UNITED STATES PATENT OFFICE

KORNEL C. BERGER, OF NEW YORK, N. Y.

ORNAMENTAL GUARD FOR AUTOMOBILE RADIATORS

Application filed August 22, 1930. Serial No. 477,156.

This invention relates to accessories for automobiles, and has particular reference to an ornamental guard disposed in advance of the radiator.

At the present time, guards of this character are constructed of a frame of angle cross section, to which the grille is secured by a welding operation, which, in addition to the expense involved, is objectionable, due to the tendency of the guard to warp under the welding heat.

The present invention, therefore, aims to materially reduce the cost of production of the guard and at the same time to avoid the possibility of warping, by providing a channeled frame which completely embraces the edge of the grille, thereby eliminating the necessity of welding or employing other equivalent means for securing the grille to the frame.

The invention further aims to provide a simple and improved means for attaching the guard to the vehicle without requiring alteration thereto and without necessitating the use of special tools or the services of a mechanic.

The invention further resides in the provision of an ornamental guard of the character indicated, which is strong and durable in its construction, comparatively light in weight, and which is highly attractive and ornamental in its appearance, while comparatively inexpensive to produce.

With the above recited and other objects in view, reference is had to the following description and accompanying drawings, in which there is exhibited one example or embodiment of the invention, while the claims define the actual scope of the same.

In the drawings:

Figure 1 is a front view of the guard in applied position to an automobile.

Figure 2 is a plan view thereof.

Figure 3 is an enlarged fragmentary front view, with parts broken away and shown in section to disclose the underlying structure.

Figure 4 is a sectional plan view taken approximately on the line 4—4 of Figure 3.

Figure 5 is an enlarged fragmentary sectional view taken approximately on the line 5—5 of Figure 1.

Figure 6 is a fragmentary sectional plan view taken approximately on the line 6—6 of Figure 5.

Referring to the drawings by characters of reference, A designates a woven, interlocked or other equivalent grille section, and B the frame by which it is carried. The frame B is preferably made of two sections of cross sectional channel shaped material, the upper section 10 being shaped to conform to the general shape of the sides and top of the radiator shell of the automobile to which it is applied, and the lower section 11 extending across, secured to and bridging the free ends of the upper section. The channel shaped material from which the frame sections are made presents a marginal internal receiving groove 12 for the free edges of the grille A, which snugly fits therein and hence eliminates the necessity of resorting to welding or other equivalent securing means. In practice, the grille A is cut to the desired shape and size to fit within the upper frame section 10 and is slid into place, after which the lower frame section 11 is applied in any desired manner, preferably by means of bolts 13 and nuts 14.

In order to provide means for attaching the guard to the vehicle, a cross bar 15 is secured to the lower end, preferably by extending the shanks of the bolts 13 through openings in the cross bar and screwing the additional nuts 16 on the protruding ends of the shanks of said bolts 13, as clearly illustrated in Figure 4 of the drawings. The terminals 17 of the cross bar are then bent in the desired manner to fit over the portions C of the fenders D which cover the chassis frame, and said terminals 17 are slotted as at 18 to receive therethrough the usual screws E which attach the portions C of the fenders to the chassis frame. This supports the lower end of the guard from the vehicle, and said guard is further secured in place by U-bolts 19, which engage around the usual cross rod F which mounts the headlights G. The threaded terminals 20 of the U-bolts 19 extend through the resilient leaves of channel members 21 which are embracingly engaged over the opposite side rails of the upper frame section 10 and nuts 22 are screwed on the threaded terminals 20 of the U-bolts to clamp the resilient leaves frictionally against the frame. This frictionally grips the frame and securely holds the same against relative movement with respect to the channel members. In some instances, the cross bar 15 may be dispensed with and the channel members 21 only employed for attaching the guard in place on the vehicle. If desired, a suitable cushion strip 23 of rubber or the like may be interposed between the channel members 21 and the cross rod F.

From the foregoing, it will thus be seen that an ornamental guard for automobile radiators has been designed which is simple in its construction, inexpensive to manufacture, which is light, strong and durable, and which may be easily attached to or removed from the vehicle without requiring special tools or the services of a mechanic for the purpose. It will be further observed that the grille A is associated with the frame B without resorting to welding or other expensive equivalent means of connection.

While there has been illustrated and described a preferred embodiment of the invention, it is to be clearly understood that no limitation is necessarily made to the precise structural details, but that variations and modification which properly fall within the scope of the appended claims may be resorted to when found desirable.

What is claimed is:

1. An ornamental guard for automobile radiators, including a grille and a channeled frame fitted over the edges of the grille, said frame having a separate section applied thereto after the positioning of the grille within the remainder of the frame.

2. An ornamental guard for automobile radiators, including a grille and a channeled frame fitted over the edges of the grille, said frame having a separate section applied thereto after the positioning of the grille within the remainder of the frame and a cross bar at the lower end of the frame for attaching the guard to the vehicle.

3. An ornamental guard for automobile radiators, including a grille and a channeled frame fitted over the edges of the grille, said frame having a separate section applied thereto after the positioning of the grille within the remainder of the frame, a cross bar at the lower end of the frame for attaching the guard to the vehicle and a common means for securing said separate frame section to the remainder of the frame and said cross bar to the guard.

4. An ornamental guard for automobile radiators, including a grille, a channeled frame fitted over the edges of the grille and means for attaching said guard to the vehicle, said means including a cross bar secured to the lower end of the frame having anchoring terminals, channel shaped members fitted over the opposite sides of the frame and U-bolts embracing the cross rod of the vehicle and engaging through said channel members.

5. An ornamental guard for automobile radiators, including a woven grille and a cross sectionally channel shaped frame receiving the edges of the grille and having integral upper and side rails and a separate lower rail secured to the lower ends of the side rail.

6. An ornamental guard for automobile radiators, including a woven grille and a cross sectionally channel shaped frame receiving the edges of the grille and having integral upper and side rails and a separate lower rail secured to the lower ends of the side rail, a cross bar having anchoring terminals and a common means for securing the cross bar to the lower rail and said lower rail to the side rails.

7. An ornamental guard for automobile radiators, including a woven grille and a channeled frame presenting grooved inner edges applied to the edges of the grille and constituting the sole means for securing the grill with the frame.

8. An ornamental guard for automobile radiators, including a woven grille and a channeled frame presenting grooved inner edges applied to the edges of the grille and constituting the sole means for securing the grill with the frame and means for attaching the guard to the automobile including channel members having resilient leaves engaging the opposite side edges of the frame and U-bolts engaged through the leaves and embracing the cross rod of the vehicle and serving to advance the leaves toward each other to frictionally grip the frame.

Signed at New York in the county of New York and State of New York this 1st day of August, 1930.

KORNEL C. BERGER.